G. M. EATON.
STORAGE BATTERY LOCOMOTIVE.
APPLICATION FILED JULY 28, 1917.
1,256,214.
Patented Feb. 12, 1918.
2 SHEETS—SHEET 2.
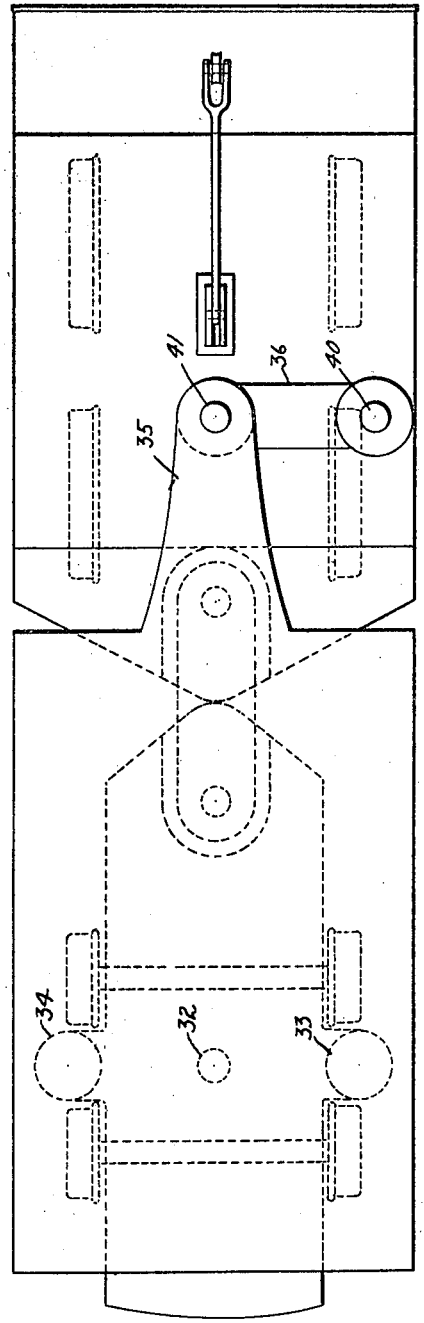
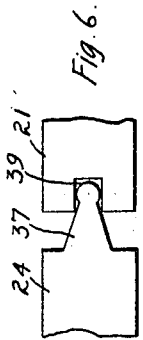
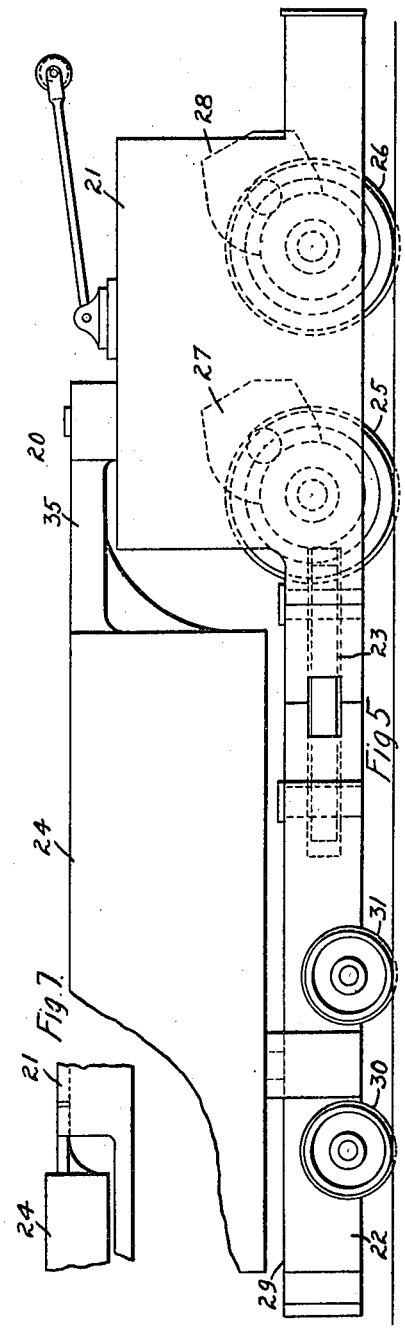
WITNESSES:
T. R. Krear
W. B. Wells,
INVENTOR
George. M. Eaton
BY
Wesley G. Carr
ATTORNEY

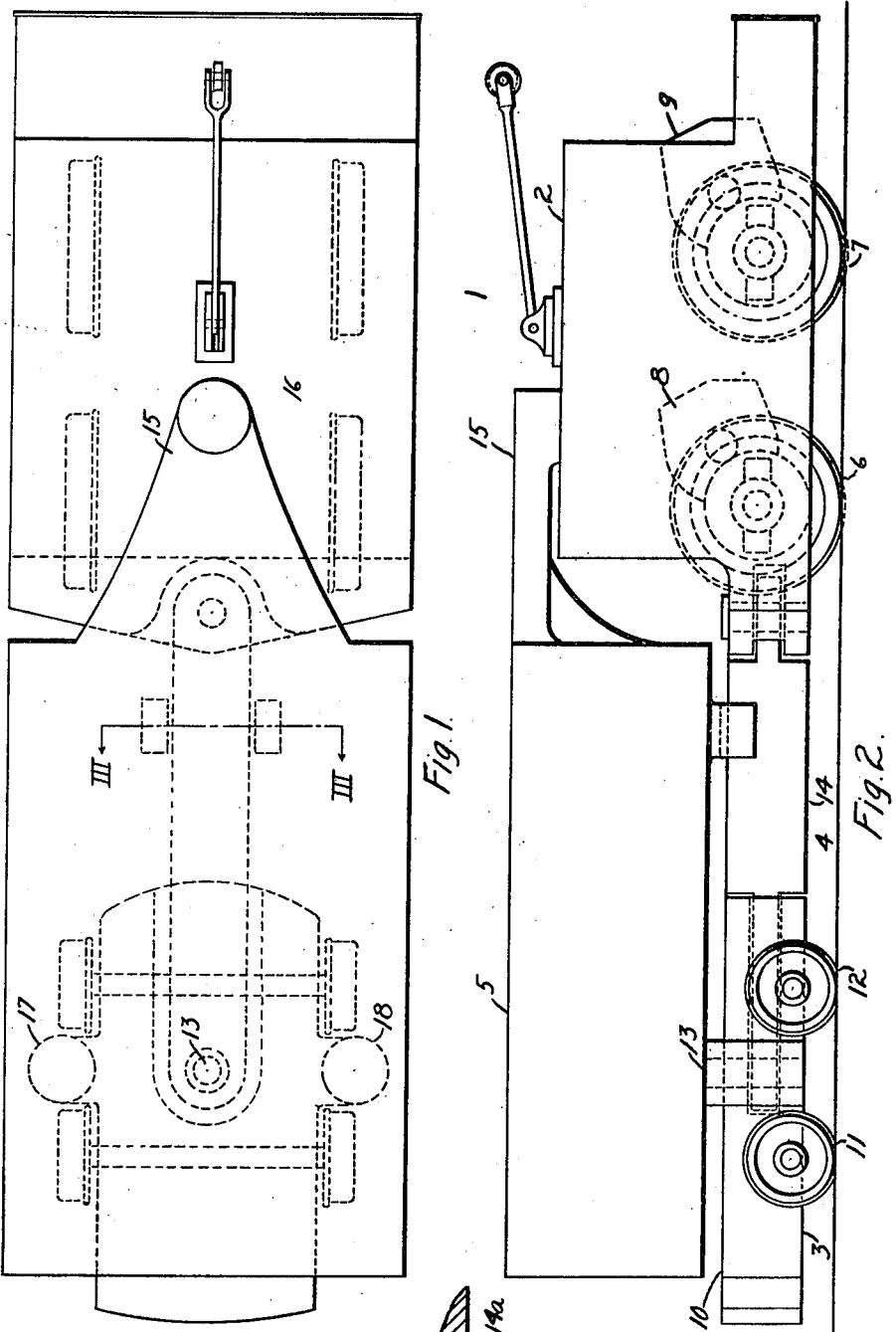

UNITED STATES PATENT OFFICE.

GEORGE M. EATON, OF PITTSBURGH, PENNSYLVANIA, ASSIGNOR TO WESTINGHOUSE ELECTRIC & MANUFACTURING COMPANY, A CORPORATION OF PENNSYLVANIA.

STORAGE-BATTERY LOCOMOTIVE.

1,256,214.  Specification of Letters Patent.  Patented Feb. 12, 1918.

Application filed July 23, 1917. Serial No. 183,333.

*To all whom it may concern:*

Be it known that I, GEORGE M. EATON, a citizen of the United States, and a resident of Pittsburgh, in the county of Allegheny and State of Pennsylvania, have invented a new and useful Improvement in Storage-Battery Locomotives, of which the following is a specification.

My invention relates to industrial locomotives and particularly to storage-battery locomotives that are adapted for service in mines or other industrial properties.

One object of my invention is to provide a storage-battery locomotive of low height that shall be simple, rugged and relatively inexpensive in construction and be conveniently operated from a storage battery or from an external supply circuit at will.

Another object of my invention is to provide a storage-battery locomotive of the above-indicated character that shall embody a propelling truck, an auxiliary low-height truck for supporting a storage battery and an articulated connection for joining the two trucks, whereby the propelling truck may be conveniently disconnected from the auxiliary truck and be operated as a unitary locomotive.

More specifically, my invention embodies a locomotive provided with a propelling truck, an auxiliary low-height truck having an articulated connection to the propelling truck, a storage-battery section located above the auxiliary truck and having a portion of the weight thereof supported on the propelling truck in a manner to insure good riding and tracking characteristics in the locomotive.

Storage-battery locomotives are now in service that embody two propelling trucks and a storage-battery section located therebetween. However, locomotives of the above type are objectionable because the stresses and strains of the locomotive are transmitted through the storage-battery section and because the propelling truck may not be disconnected from the battery section to be operated, as a unitary locomotive, from a trolley supply circuit.

In a locomotive provided with a propelling and an auxiliary truck and constructed in accordance with my invention, the two trucks embodied therein are joined by an articulated connection in order to avoid transmitting the tractive effort of the propelling truck through the storage-battery section and to permit disconnection of the two trucks so that the propelling truck may be operated as a unitary locomotive when supplied with energy from an external supply circuit. Moreover, the major portion of the storage-battery section is located above the auxiliary low-height truck in order to extend but slightly over the height of the propelling truck and is provided with means for supporting a portion of the weight thereof on the propelling truck in such manner as to maintain the storage-battery section in correct position relative to the two trucks of the locomotive.

In the accompanying drawings, Figure 1 is a plan view of a locomotive constructed in accordance with my invention; Fig. 2 is a side elevational view of the locomotive illustrated in Fig. 1; Fig. 3 is a sectional view along the line III—III in Fig. 1; Fig. 4 is a plan view of a modified locomotive; Fig. 5 is a side elevational view of the locomotive illustrated in Fig. 4, and Figs. 6 and 7 are detail views illustrating a modified means for supporting a portion of the weight of the battery section on the propelling truck.

Referring to Figs. 1, 2 and 3 of the drawings, a locomotive 1 embodies a main propelling truck 2, an auxiliary idle low-height truck 3, an articulated connection 4 for joining the two trucks 2 and 3, and a storage-battery container section 5 which is located over the auxiliary truck 3.

The propelling truck 2 embodies two pairs of driving wheels 6 and 7 which are respectively connected to motors 8 and 9. The auxiliary truck 3 embodies a body portion 10 and two pairs of wheels 11 and 12 which are preferably of a smaller diameter than the diameter of the driving wheels 6 and 7 which are associated with the propelling truck 2. The battery section 5 is joined to the auxiliary truck 3 by means of the pivotal connection 13 which serves as a means for restraining the battery section from movement relative to the auxiliary truck in a lateral and in a longitudinal direction. The battery section is provided with two projections 14$^a$ and 14$^b$ which are disposed at the sides of the bar 14 of the articulated connection 4 to restrain the battery section from movement, relative to the articulated connection, in a lateral direction.

The pivotal connection 13 between the battery section and the auxiliary truck is preferably relieved of the weight of the battery section by means of the side bearings 17 and 18 which are disposed to the sides of the pivotal connection 13. A projection 15 extends from the battery section 5 and serves to support a portion of the weight thereof on the propelling truck 2 and thus relieve the articulated connection 4 of any substantial portion of the weight of the battery section. The three-point support for the battery section, embodying the side bearings 17 and 18 and the projection 15, insures an equitable weight of distribution of the battery section and improves the riding and tracking characteristics of the locomotive. It is apparent that, if so desired, the battery section may be provided with a one-point support on the auxiliary truck 3 and a two-point support on the propelling truck 2.

The articulated connection 4 is preferably joined to the auxiliary truck 3 at a point near the center thereof in order to avoid skewing tendencies and thus insure good riding qualities of the truck, but it is to be understood that it is not essential that the articulated connection be joined to the auxiliary truck at this point, as the same may be attached to the truck at any point along the longitudinal center line thereof.

Referring to Figs. 4 and 5, a locomotive 20 embodies a propelling truck 21, an auxiliary low-height truck 22, an articulated connection 23 for joining the two trucks 21 and 22, and a storage-battery section 24 which is located above the auxiliary truck 22. The propelling truck 21, which is similar to the propelling truck disclosed in Figs. 1 and 2, is provided with two pairs of driving wheels 25 and 26 which are respectively associated with propelling motors 27 and 28. The auxiliary truck 22 embodies a body section 29 for supporting a portion of the weight of the storage-battery section 24, and two pairs of wheels 30 and 31. The propelling truck 21 and the auxiliary truck 22 are connected together, near their adjacent ends, by means of the articulated connection 23.

The storage-battery section 24 is joined to the auxiliary truck 22 by means of a pivotal connection 32, and a portion of the weight thereof is supported on the auxiliary truck by means of side bearings 33 and 34 of any well-known type. The side bearings 33 and 34 serve substantially to relieve the pivotal connection 32 of the weight of the battery section 24. Moreover, the storage-battery section is provided with an extension 35 for supporting a portion of the weight of the battery section 24 on the propelling truck 21. A link 36, which is joined to the propelling truck 21 by the pivotal connection 40, and is connected to the projection 35 by the pivotal connection 41, is provided for coöperating with the pivotal connection 32 between the battery section and the auxiliary truck to maintain the battery section in correct position relative to the propelling and auxiliary trucks 21 and 22. The projection 35 from the battery section 24 frictionally engages the propelling truck 21 in order to permit the free movement of the battery section relative to the propelling truck and thus prevent the transmission of any extreme stresses and strains through the battery section. Any desired weight distribution of the battery section on the truck 21 may be obtained by varying the length of the projection 35. The pivotal connection 32 serves to prevent movement of the battery section 24 in a lateral or in a longitudinal direction relative to the auxiliary truck 22. The link 36, associated with the propelling truck 21 and the battery section 24, serves to prevent lateral movement of the battery section relative to the propelling truck 21.

The battery section 24 is provided with a three-point support on the propelling and the auxiliary truck. In the modification illustrated in Figs. 4 and 5 of the drawing, the side bearings 33 and 34 serve as a two-point support for the battery section on the auxiliary truck 32, and the projection 35 serves as a one-point support for the battery section on the propelling truck 21.

Referring to Figs. 6 and 7, a modified means for supporting a portion of the weight of the battery section on the propelling truck and for maintaining the same in correct position relative to the two trucks is illustrated, and, in describing this modification, reference characters corresponding to those employed in connection with Figs. 4 and 5 will be used to designate similar parts.

The battery section 24 is provided with an extension 37 which projects within a pocket 39 formed in the propelling truck 21. The extension 37 is disposed in the pocket 39 in a manner to prevent any lateral movement thereof but to permit a limited longitudinal movement, as is indicated in Figs. 6 and 7.

Modifications in the structure and arrangement and location of parts may be made within the spirit and scope of my invention, and such modifications are intended to be covered by the appended claims.

I claim as my invention:

1. In a locomotive, the combination with two trucks having an articulated connection therebetween, of an auxiliary section located over, and pivotally connected to, the first truck, and means associated with said section and coöperating with the pivotal connection between the section and the first truck for maintaining the auxiliary section in correct position relative to the two trucks.

2. In a locomotive, the combination with a four-wheel propelling truck having a plurality of motors associated therewith, a four-wheel idle truck of low height, and an articulated connection between said trucks, of an auxiliary section located above and pivotally connected to the truck of low height, and means for maintaining the auxiliary section alined with the two trucks.

3. In a locomotive, the combination with two trucks having an articulated connection therebetween, of an auxiliary section located over, and supported on, the first truck, and means associated with said section for maintaining the same in correct relation to the two trucks and for relieving the first truck of a portion of the weight of the auxiliary section.

4. In a storage-battery locomotive, the combination with a propelling truck, an auxiliary truck, and an articulated connection between said trucks, of a battery section located above, and pivotally connected to, the auxiliary truck, and means associated with the pivotal connection between the battery section and the auxiliary truck for maintaining the battery section in correct relation to the two trucks.

5. In a locomotive, the combination with two trucks having an articulated connection therebetween, of an auxiliary section located over one of said trucks, and means associated with the two trucks for maintaining the auxiliary section alined with the two trucks.

6. In a locomotive, the combination with two trucks having an articulated connection therebetween, of an auxiliary section so located over the first truck as to extend but slightly over the height of the second truck, and means including a pivotal connection between one of said trucks and the auxiliary section for maintaining the auxiliary section in correct relation to the two trucks.

7. In a storage-battery locomotive, the combination with a truck having propelling motors mounted thereon, an auxiliary truck, and an articulated connection between said trucks, of a battery section pivotally supported on said auxiliary truck and laterally restrained by means of said articulated connection, and means for supporting a portion of the weight of said battery section on the propelling truck.

8. In a storage-battery locomotive, the combination with a propelling truck, an auxiliary weight-carrying truck, and an articulated connection between said trucks, of a battery section located above said auxiliary truck and having a pivotal connection to said auxiliary truck and laterally restrained by means of the articulated connection between the two trucks.

9. In a storage-battery locomotive, the combination with two trucks having an articulated connection therebetween, of a battery section having a pivotal connection to one of said trucks and laterally restrained by means of the articulated connection between the two trucks.

10. In a locomotive, the combination with two trucks having an articulated connection therebetween, of a section having a pivotal connection to the first truck and laterally restrained by means of the articulated connection between the two trucks, and means for supporting a portion of the weight of said section on the second truck.

11. In a locomotive, the combination with a propelling truck, an auxiliary truck, and means for connecting said trucks, of a battery section mounted on said trucks, means for restraining the battery section near one end thereof from movement in a lateral and in a longitudinal direction and for restraining the battery section near the other end thereof from movement in a lateral direction.

12. In a storage-battery locomotive, the combination with a main truck equipped with propelling means, of an auxiliary truck, a storage-battery container section supported on said trucks, and means forming an articulated connection between said trucks independently of said container section and coöperating with means on said container section to control the lateral movement of the latter.

13. In a locomotive, the combination with a plurality of trucks, and an articulated connection for joining said trucks, of an auxiliary section, and means associated with said connection for restraining the auxiliary section from movement relative to said trucks.

14. In a storage-battery locomotive, the combination with a propelling truck, an idle low-height truck, and an articulated connection between said trucks, of a battery section located above said low-height truck and extending but slightly over the height of the propelling truck, means for supporting a portion of the weight of the battery section on each of said trucks, and means for restraining the battery section from movement relative to one of said trucks in a longitudinal and in a lateral direction.

15. In a storage-battery locomotive, the combination with a propelling truck, an idle low-height truck, and an articulated connection between said trucks, of a battery section located above said low-height truck and extending but slightly over the height of the propelling truck, means for supporting a portion of the weight of the battery section on each of said trucks, means for restraining the battery section from movement relative to one of said trucks in a lateral and in a horizontal direction, and means for restraining the battery section from movement in a lateral direction relative to the articulated connection between the trucks.

16. In a storage-battery locomotive, the combination with a plurality of trucks and an articulated connection between said trucks, of a battery section located above one of said trucks, means for restraining said battery section from movement relative to a portion of the locomotive in a lateral and in a longitudinal direction, and means for restraining the battery section from movement in a lateral direction relative to another portion of said locomotive.

17. In a storage-battery locomotive, the combination with a main truck equipped with propelling means, an auxiliary truck of lower height than the main truck, an articulate draft connection between said trucks, a storage-battery container section having the major portion thereof disposed above, and supported by, the auxiliary truck and also having means whereby a portion of the weight thereof is transmitted to said main truck, and means whereby the lateral movement of said container section is controlled.

18. In a storage-battery locomotive, the combination with a main truck equipped with propelling means, of an auxiliary truck of lower height than said main truck, a storage-battery container section pivotally connected to each of said trucks and having the major portion thereof disposed above said auxiliary low-height truck, and means forming an articulated draft connection between said trucks independently of said container section and coöperating with means on said container section to control the lateral movement of the latter.

In testimony whereof, I have hereunto subscribed my name this 23rd day of July 1917.

GEORGE M. EATON.

Copies of this patent may be obtained for five cents each, by addressing the "Commissioner of Patents, Washington, D. C."